United States Patent
Cheng et al.

(10) Patent No.: US 8,928,328 B2
(45) Date of Patent: Jan. 6, 2015

(54) TESTING DEVICE FOR SOLID OXIDE FUEL CELL

(75) Inventors: Shih-Wei Cheng, New Taipei (TW); Yaw-Hwa Shiu, Taoyuan County (TW); Yung-Neng Cheng, Taoyuan County (TW); Ruey-Yi Lee, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 427 days.

(21) Appl. No.: 13/352,671

(22) Filed: Jan. 18, 2012

(65) Prior Publication Data

US 2013/0093456 A1    Apr. 18, 2013

(30) Foreign Application Priority Data

Oct. 18, 2011    (TW) .............................. 100137778 A

(51) Int. Cl.
| | | |
|---|---|---|
| *G01N 27/416* | (2006.01) | |
| *H01M 8/02* | (2006.01) | |
| *H01M 8/04* | (2006.01) | |
| *H01M 8/12* | (2006.01) | |

(52) U.S. Cl.
CPC ........ *H01M 8/0202* (2013.01); *H01M 8/04552* (2013.01); *H01M 8/04582* (2013.01);
(Continued)

(58) Field of Classification Search
CPC ..... Y02E 60/525; Y02E 60/50; Y02E 60/521; G01R 19/00; G01R 19/08; G01N 27/26; G01N 27/404; G01N 27/4605; G01N 27/02; H01M 8/1002; H01M 8/1004; H01M 8/04552; H01M 8/04649; H01M 8/04298; H01M 8/04611; H01M 8/0206; H01M 8/0213
USPC ...................... 324/434, 464, 425, 444, 76.11; 429/160, 517, 467, 495, 488, 479, 535, 429/457, 452
See application file for complete search history.

(56) References Cited

U.S. PATENT DOCUMENTS 6,167,721 B1 *  1/2001  Tsenter ........................... 62/480
7,910,158 B2    3/2011  Lemmon et al.
(Continued)

FOREIGN PATENT DOCUMENTS

TW    M272988        8/2005
TW    201015770      4/2010

OTHER PUBLICATIONS

"Measurement of the current distribution along a single flow channel of a solid polymer fuel cell." Electrochemistry Communications 3 (2001) 628-632, Brett et al.

(Continued)

*Primary Examiner* — Huy Q Phan
*Assistant Examiner* — Thang Le
(74) *Attorney, Agent, or Firm* — WPAT, PC; Justin King

(57) ABSTRACT

A testing device for solid oxide fuel cell (SOFC) is disclosed. The testing device which combines the original cell housing with a four-point probe equipment is set for measuring SOFC MEA. The current collectors on anode and cathode in the original cell housing are respectively replaced by four independent probe units. They are not only to collect current but also to become measuring probes. Therefore, the lateral impedance of anode and cathode can be measured. Furthermore, the local characteristics are examined by open circuit voltage (OCV), I-V curve, and electrochemical impedance spectroscopy (EIS) measurements. The results show that the lateral impedance is substantially varied with temperatures. The distributions of OCV, current density, EIS and cell voltage in long-term test at the center of the cell are different from the edge.

9 Claims, 3 Drawing Sheets

(52) U.S. Cl.
CPC ...... *H01M 8/04641* (2013.01); *H01M 8/04671* (2013.01); *H01M 8/0258* (2013.01); *H01M 8/04611* (2013.01); *H01M 2008/1293* (2013.01); *Y02E 60/50* (2013.01); *Y02E 60/525* (2013.01)
USPC ........... 324/434; 324/464; 324/425; 324/444; 324/76.11; 429/160; 429/517; 429/467; 429/495

(56) References Cited

U.S. PATENT DOCUMENTS

| | | | |
|---|---|---|---|
| 8,568,914 B2* | 10/2013 | Pol et al. | 429/156 |
| 2005/0064251 A1* | 3/2005 | Li et al. | 429/12 |
| 2005/0260471 A1 | 11/2005 | Logan et al. | |
| 2007/0087237 A1* | 4/2007 | An et al. | 429/23 |
| 2007/0092773 A1* | 4/2007 | Guo et al. | 429/24 |
| 2007/0154761 A1* | 7/2007 | Eun et al. | 429/32 |
| 2007/0279051 A1* | 12/2007 | Kataoka | 324/226 |
| 2008/0057381 A1* | 3/2008 | Jang et al. | 429/46 |
| 2009/0004524 A1* | 1/2009 | Wang et al. | 429/30 |
| 2009/0186257 A1* | 7/2009 | Sakai et al. | 429/34 |
| 2009/0246593 A1* | 10/2009 | Nowatari et al. | 429/33 |
| 2011/0165495 A1* | 7/2011 | Schrooten et al. | 429/479 |
| 2011/0177421 A1* | 7/2011 | Wolk et al. | 429/472 |
| 2012/0003568 A1* | 1/2012 | Schrooten et al. | 429/517 |
| 2012/0231358 A1* | 9/2012 | Akiyama | 429/414 |

OTHER PUBLICATIONS

"Effect of contact between electrode and current collector on the performance of solid oxide fuel cells." Solid State Ionics 160 (2003) 15-26, Jiang et al.
"SOFC characteristics along the flow path" Solid State Ionics 177 (2006) 2045, Metzger et al.
"Thermo-electrochemical and thermal stress analysis for an anode-supported SOFC cell", Renewable Energy 33 (2008) 2580, Chiang et al.

* cited by examiner

TESTING DEVICE FOR SOLID OXIDE FUEL CELL

FIELD OF THE INVENTION

The present invention relates to a technique for testing solid oxide fuel cells (SOFCs), and more particularly, to a testing device for solid oxide fuel cell.

BACKGROUND OF THE INVENTION

In the research and development of solid oxide fuel cells (SOFCs), all the major difficulties encountered are related to material development, i.e. in an effort to find suitable materials to be used in SOFC components, such as anode, cathode, or electrolyte. Presently, the most commonly used SOFC anode material is a two phase nickel and yttria stabilized zirconia (Ni/YSZ) cermet, and since the electrical conductivity of Ni/YSZ cermet is strongly depended on its nickel content in a manner that the resistance decreased as the Ni/YSZ ratio was increased and thus the performance of the resulting SOFC is enhanced. On the other hand, it is found that $La_{(1-x)}Sr_xMnO_3$ (LSM) is the most suitable cathode material today. Since the porosity up to a certain percent is necessary to transport oxygen gas to the interface region between the electrolyte and the LSM cathode and thus the electrical conductivity of LSM cathode is strongly depended on its porosity, the resistance increased as the porosity in LSM cathode was increased. Thus, in addition to the ion conductivity of an electrolyte used in SOFCs, the electric conductivities of the anode and the cathode also have profound effects on the cell performance.

Conventionally, the performance tests and failure diagnoses that are used for testing SOFCs are concerned with the measurement in overall cell performance and assessment in longitudinal impedance. However, in order to produce a SOFC that is commercially viable, the SOFC must be made in a size at least as large as 5 cm×5 cm, or even in a size of 10 cm×10 cm. For those large-size SOFC, the results obtained from the performance tests or the impedance assessments are generally average values relating to the whole SOFC, and it is difficult to characterize and to quantify the area where the electrochemistry takes place. However, such local characteristic differences can be an importance factor affecting the performance and durability of the SOFC.

Generally, in a fuel cell measurement, the impedance analysis for anode material and cathode material is processed at ambient temperature using a four-point probe fixture. However, such analysis can be problematic while being processed under high temperature. Moreover, for those conventional performance test, impedance analysis and durability test, the good or bad of a cell that is being tested is simply represented by an average value, according to that any minute regional differences in the cell that can affect the performance of the cell will not be detected.

The following is a list of conventional fuel cell measurement techniques, which includes:

(1) In an article disclosed in *Electrochemistry Communications*, volume 3, issue 11, November 2001, pages 628-632, by Brett et al., a method of performing high spatial and time-resolution, non-intrusive and dynamic current measurements along the length of a single flow channel in a solid polymer fuel cell is provided. In this article, it suggests that the farther in the flow channel that is to the inlet, the lower the current density will be, and along with the decreasing in the operation voltage, the larger the difference in the current density will be, resulting that the measurement of performance is unevenly distributed across the fuel cell. In addition, the aforesaid measurement is designed specifically for fuel cells with single flow channel that it is not suitable for measuring large-sized fuel cells.

(2) In an article disclosed in *Solid State Ionics*, volume 160 (2003), pages 15-26, by Jiang et. al., the effect of contact area between electrode and current collector on the performance of anode-supported solid oxide fuel cells (SOFC) has been investigated using current collector with various contact area on the PSM cathode side. Nevertheless, the aforesaid measurement can not be adapted for testing the overall performance of the SOFC, and also it is difficult to characterize and to quantify the area where the electrochemistry takes place for obtaining local characteristic differences in the SOFC.

(3) In an article disclosed in *Solid State Ionics*, volume 177 (2006), pages 2045-2051, by Metzger et. al., a new measurement system is provided for determining local effects and identifying critical parameters in a fuel cell. For technical applications, the fuel cell is divided and integrated in a metallic housing while allowing a process for determining the voltage distribution all over the fuel call to be performed upon the working fuel cell. In addition to the fuel cell had to be divided and segmented before the measurement can be performed, the aforesaid system is not capable of measuring anode impedance and cathode impedance.

(4) In an article disclosed in *Renewably Energy*, volume 33 (2008), pages 2580-2588, by Chiang et. al., the main objective is to evaluate the fuel/oxidant gas distributions as well as thermal stresses of an anode-supported solid oxide fuel cell (SOFC) test cell under different operating conditions. In this study, the commercial computational fluid dynamics (CFD) code Star-CD with es-sofc module is employed to simulate the current-voltage (I-V) characteristics and to provide the temperature field of the cell to the commercial code MARC for further thermal stress analysis. The simulation results indicate that the cells experience higher principal stresses at lower cell voltages due to a higher local current density and a higher temperature gradient. The result of a digital analysis provided in the paper is obtained under a homogeneous assumption, but if there are local characteristic differences in the SOFC, the result should be calibrated according to actual experiment.

Moreover, there are already many studies relating to fuel cell measurement. One of which is a tool for testing fuel cells disclosed in TW Pat. No. M272988. The tool for testing fuel cells comprises: a top platform; a bottom platform; a top mold, mounted on the top platform; a bottom mold, being formed with an accommodation space to be used for receiving a fuel cell module that is to be test and being mounted on the bottom platform while allowing the bottom mold to be spaced from the top mold by a stroke distance; and a plurality of drivers, each being configured with a drive shaft and each being fixedly mounted on the bottom platform; wherein the drive shafts of the plural drivers are fixedly secured to the top platform while allowing the axes thereof to be parallel with one another; and each drive shaft is configured for allowing each to be moved by a distance exactly equal to the stroke distance. Operationally, when the drive shafts of the plural drivers are moved by the stroke distance, the top mold and the bottom mold will be moved accordingly to engage tightly with each other while enabling the fuel cell module to be sandwiched between the top mold and the bottom mold so as to be tested. Nevertheless, while using the aforesaid tool for testing fuel cells, the fuel cell is generally being integrated with other components, such as current-collector layer, splitter plate or end panel, etc., into a single cell module that can only be test as a whole and thus is unable to obtain local characteristic differences in the single cell module.

Another such study is a rapid set-up, double chamber detecting device of SOFC positive electrolyte negative (PEN) assembly, that is disclosed in TW Pat. Pub. No. 201015770. The double chamber detecting device comprises: a metal case, insulated ceramic rings, an easily install chamber of anode, and the current collected unit of anode and cathode. This device is able to measure the performance of SOFC PEN plate rapidly and repeatedly, it's costless, easy to assemble, rapid set-up, high safety, excellent sealing and etc. In addition, it is helpful to develop the commercial application of SOFC PEN plate and improve the material study of SOFC PEN. However, since such detecting device is generally made of metal that can be easily oxidized under high temperature causing by the operating fuel cell, the impedance of the fuel cell that is being tested is increased. In addition, as the resulting oxide might peel off from the surface of the metal detecting device after being used repetitively for a long period of time, not only the geometry of the detecting device might changed accordingly, but also the poisoning effect resulting from the ionization of the peeled oxide can cause the degradation of the fuel cell to accelerate, and therefore, adversely affecting the measurement of SOFC performance.

Another such study is a method for fabricating an array of electrode and electrolyte materials for use in solid oxide fuel cells, which is disclosed in U.S. Pat. No. 7,910,158. The aforesaid patent includes systems and methods for synthesizing and optimizing the performance of electrodes and electrode-electrolyte combinations and utilizes small-scale techniques to perform such optimization based on chemical composition and variable processing. Advantageously, rapid device performance systems and methods coupled with structural and surface systems and methods allow for an increased discovery rate of new materials for solid oxide fuel cells. However, it is unable to test any of the commercial fuel cells longitudinally, laterally or locally.

Another such study is an electrical current measurement in a fuel cell, which is disclosed in U.S. Pat. Pub. No. 20050260471. Operationally, a plurality of electrical current sensors for a set of fuel cell stacks in series independently measure electrical current in a fuel cell, and an acceptability status is determined for each electrical current sensor by independent comparison of each sensor measurement to the individual values of the other sensor measurements. A characteristic current measurement is derived from all electrical current sensors having an acceptability status that is trustworthy. However, it is not designed for and incapable of obtaining local characteristic differences in a single fuel cell.

Therefore, it is in need of a testing device for solid oxide fuel cell for overcoming the aforesaid shortcomings.

SUMMARY OF THE INVENTION

In view of the disadvantages of prior art, the primary object of the present invention is to provide a testing device for SOFC, using which either an overall performance of an operating fuel cell that is mounted and sandwiched between an anode splitter plate and a cathode splitter plate can be determined or local characteristics of the fuel cell can be obtained through the measurements of a plurality of current-collector units that are arranged respectively on an anode splitter plate and the cathode splitter plate.

To achieve the above object, the present invention provides a testing device for SOFC, which comprises: an anode splitter plate; a plurality of anode current-collector units, being disposed independently on a surface of the anode splitter plate; a cathode splitter plate; and a plurality of cathode current-collector units, being disposed independently on a surface of the cathode splitter plate.

Each of the anode splitter plate and the cathode splitter plate is formed with a surface which has flow channels formed thereon, and there are a plurality of anode current-collector units disposed on the channeled surface of the anode splitter plate, and similarly there are a plurality of cathode current-collector units disposed on the channeled surface of cathode splitter plate. Moreover, there are a plurality of anode voltage lines and a plurality of anode current lines that are arranged passing through the anode splitter plate and thus coupled to the plural anode current-collector units, and similarly, there are a plurality of cathode voltage lines and a plurality of cathode current lines that are arranged passing through the cathode splitter plate and thus coupled to the plural cathode current-collector units. It is noted that for the plural anode current-collector units and the plural cathode current-collector units, they are basically the same type of devices that are made of the same material and in the same size, but are different in that the anode current-collect units are formed with anode electrodes and the cathode current-collect units are formed with cathode electrodes at positions corresponding to the anode electrodes, i.e. the anode electrodes of the anode current-collector units are arranged at positions opposite to that of the cathode electrodes of the cathode current-collector units. Moreover, for the minimizing the resistance effect upon the current lines, the plural current lines are conductive lines of the same wire diameter, the same length and also made of the same material.

On the surfaces of the anode splitter plate and the cathode splitter plate where have the anode current-collector units and the cathode current-collector units mounted thereon in respective, there are flow channels formed thereon that are to be used for guiding gases and fuels to flow therein while being distributed evenly. In addition, on another surfaces of the anode splitter plate and the cathode splitter plate which are not engaged respectively with the anode current-collector units and the cathode current-collector units, there are grooves formed thereon that are to be used for allowing the current lines and the voltage lines that are connected to the anode current-collector units and the cathode current-collector units to be received therein before connecting independently to an external measuring apparatus, and thus preventing the connection to the external apparatus from being affected by external loading.

In an embodiment of the present invention, all the current lines and voltage lines that are threading through and outside a high-temperature furnace are coupled respectively to an anode terminal and a cathode terminal so as to be connected to the external apparatus. Moreover, for minimizing the chance of the metal oxidation and thus causing any toxicity in the fuel cell, all the components of the present invention, other than the anode current-collector units, the cathode current-collector units, the voltage lines and the current lines, that are supposed to be working in a high temperature zone, are mode of a ceramic material with good high temperature stability.

With the aforesaid testing device, the lateral impedance of contact layer can be measured. Furthermore, the local characteristics as well as overall cell performance are examined by open circuit voltage (OCV), I-V curve, and electrochemical impedance spectroscopy (EIS) measurements. The test device can also test the durability of a fuel cell and the degree of degradation of the same, etc.

As the test device of the present invention is designed to perform an all-aspect measurement upon commercial cell units, it is capable of not only measuring the impedance variation on both the anode layer and the cathode layer at different temperatures, but also is capable of examining the local characteristics of a cell unit, using the measurement of OCV at different positions, the measurement of power uniformity, electrochemical impedance analysis, and local efficiency variation in a durability test, and so on. For the benefit of new product research and development, it can provide feedbacks for facilitating manufacturing process improvement, and simultaneously for the benefit of product mass production, it can be used for setting up an all-aspect production protocol or standard.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
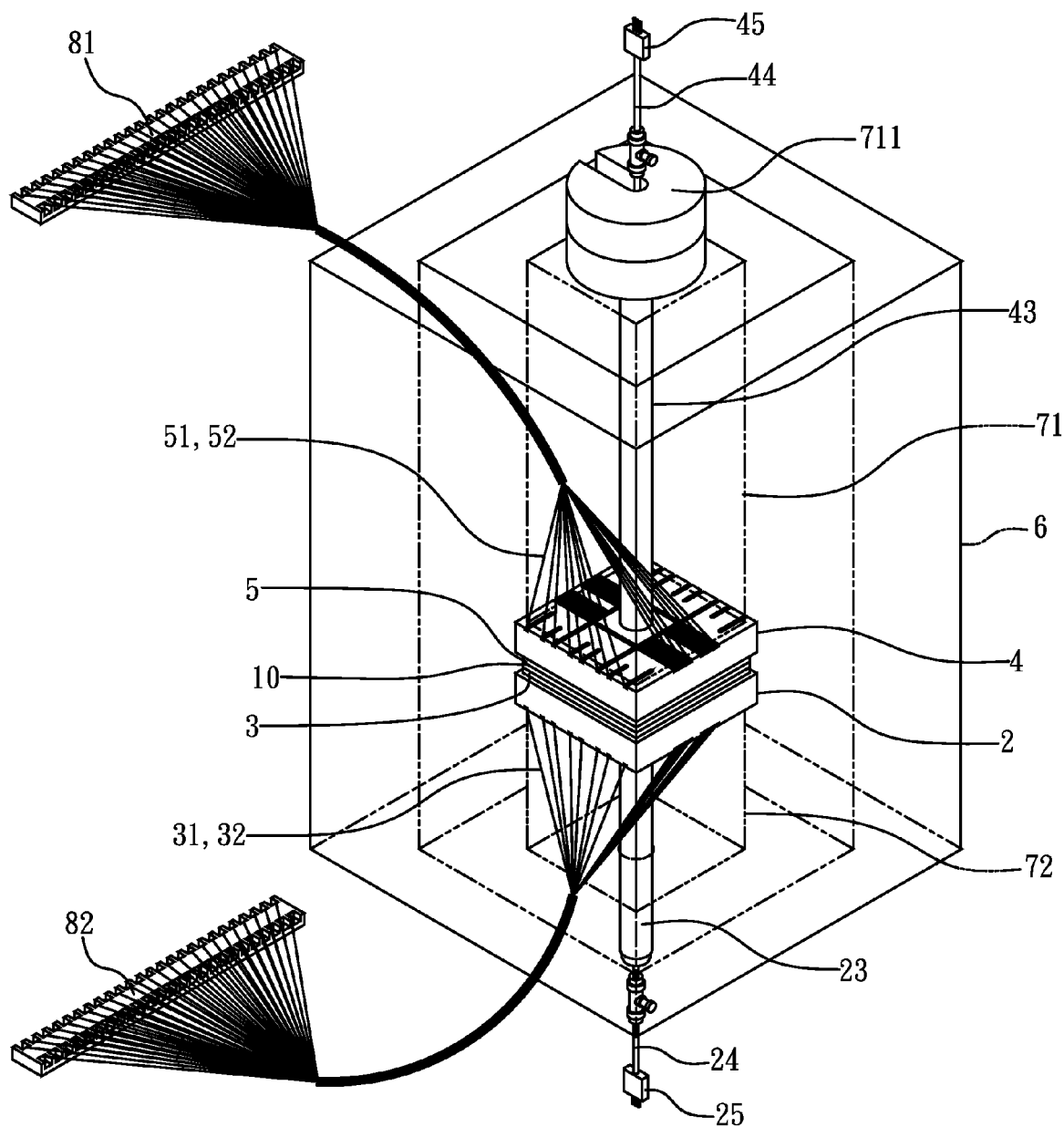
FIG. 1 is a three-dimensional view of a testing device for SOFC according to an embodiment of the present invention.
Figure 2:
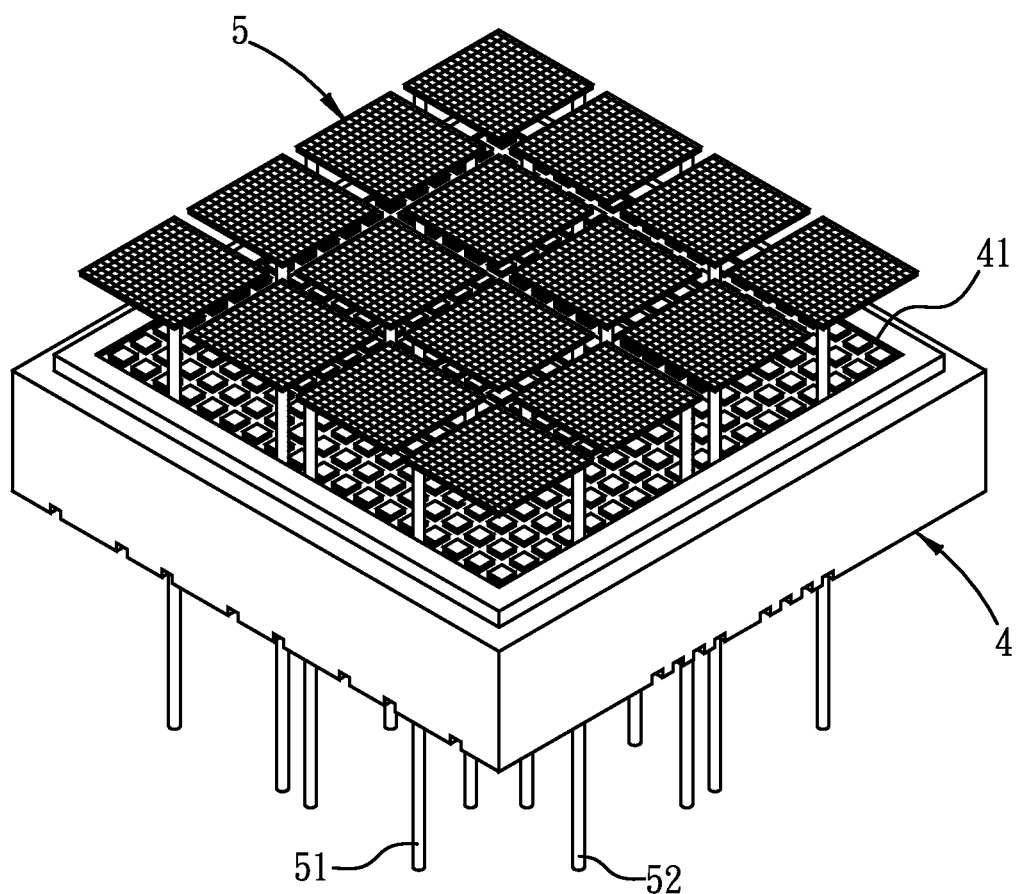
FIG. 2 is an exploded diagram showing a cathode splitter plate used in a testing device for SOFC of the present invention.
Figure 3:
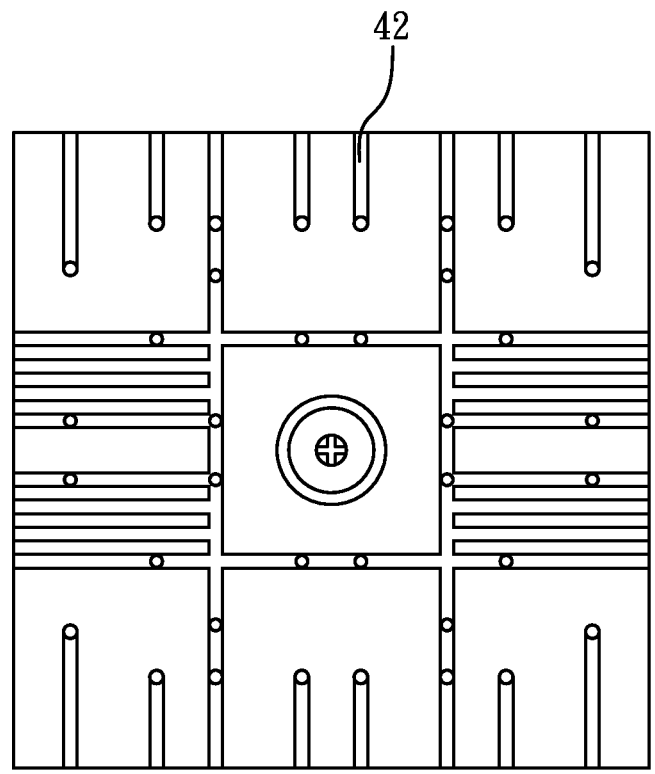
FIG. 3 is a bottom view of a cathode splitter plate used in a testing device for SOFC of the present invention.

Please refer to FIG. 1 to FIG. 3, which are a three-dimensional view of a testing device for SOFC according to an embodiment of the present invention, an exploded diagram showing a cathode splitter plate used in a testing device for SOFC of the present invention, and a bottom view of a cathode splitter plate used in a testing device for SOFC of the present invention.

As shown in FIG. 1 to FIG. 3, the testing device for SOFC in this embodiment comprises: an anode splitter plate 2; a plurality of anode current-collector units 3, each being disposed independently on a surface of the anode splitter plate 3; a cathode splitter plate 4; and a plurality of cathode current-collector units 5, each being disposed independently on a surface of the cathode splitter plate 4. Moreover, one surface of the cathode splitter plate 4 is formed with a plurality of flow channels 41 while allowing another surface of the cathode splitter plate 4 to be formed with a plurality of grooves 42; and similarly, since the anode splitter plate 2 which is being disposed corresponding to the cathode splitter plate 4 is formed structurally the same as the cathode splitter plate 4, the anode splitter plate 2 is also formed with the flow channels and grooves on the two opposite surfaces thereof.

In this embodiment, each of the plural cathode current-collector units 5 is disposed near to the cathode splitter plate 4 at a position between the cathode splitter plate 4 and the anode splitter plate 2, and the same time each cathode current-collector units 5 is connected to a plurality of cathode voltage lines 51 and a plurality of cathode current lines 52 that are arranged threading through the cathode splitter plate 4 in respective; and similarly, each of the plural anode current-collector units 3 is disposed near to the anode splitter plate 2 at a position between the cathode splitter plate 4 and the anode splitter plate 2, and the same time each anode current-collector units 3 is connected to a plurality of anode voltage lines 31 and a plurality of anode current lines 32 that are arranged threading through the anode splitter plate 2 in respective.

Moreover, the assembly of the plural cathode current-collector units 5 are spaced from the assembly of the plural anode current-collector units 3 by a gap for allowing a solid oxide fuel cell (SOFC) 10 to be disposed therebetween in a manner that the SOFC 10 is connected to the assembly of the plural cathode current-collector units 5 by a cathode electrode thereof and simultaneously connected to the assembly of the plural anode current-collector units 3 by an anode electrode thereof.

In this embodiment of the present invention, all the voltage lines 31, 51 and current lines 32, 52 that are threading through and outside a high-temperature furnace 6 are coupled respectively to an external measurement apparatus, by that the lateral impedance of contact layer in the SOFC 10 can be measured. Furthermore, the local characteristics as well as overall cell performance of the SOFC 10 are examined by open circuit voltage (OCV), I-V curve, and electrochemical impedance spectroscopy (EIS) measurements, and also the test device can test the durability of the SOFC 10 and the degree of degradation of the same, etc.

In addition, the testing device further has a gas transmission mechanism, which is disposed on the surface of the cathode splitter plate 4 where the grooves 42 are formed. In this embodiment, the gas transmission mechanism further comprises: a cathode gas conduit 43, being arranged in communication with the cathode splitter plate 4 by an end thereof; a cathode three-way tube 44, being coupled to an end of the cathode gas conduit 43 that is not coupled to the cathode splitter plate 4 for allowing the same to be in communication with the cathode gas conduit 43; and a cathode thermocouple 45, arranged extending through an end of the cathode three-way tube 44 that is not coupled to the cathode gas conduit 43, and then reaching to a cathode side of the SOFC 10. Thereby, the gas transmission mechanism can be used for gas transmission and temperature measurement. Moreover, the testing device further has a fuel transmission mechanism, which is disposed on the surface of the anode splitter plate 2 where the grooves are formed. In this embodiment, the fuel transmission mechanism further comprises: an anode gas conduit 23, being arranged in communication with the anode splitter plate 2 by an end thereof; an anode three-way tube 24, being coupled to an end of the anode gas conduit 23 that is not coupled to the anode splitter plate 2 for allowing the same to be in communication with the anode gas conduit 23; and an anode thermocouple 25, arranged extending through an end of the anode three-way tube 24 that is not coupled to the anode gas conduit 23, and then reaching to an anode side of the SOFC 10. Thereby, the fuel transmission mechanism can be used for fuel transmission and temperature measurement.

Before the operation of testing a fuel cell is performed, there are a plurality of anode current-collector units 3 disposed on the channeled surface of the anode splitter plate 2, and similarly there are a plurality of cathode current-collector units 5 disposed on the channeled surface of cathode splitter plate 4. Moreover, there are a plurality of anode voltage lines 31 and a plurality of anode current lines 32 that are arranged passing through the anode splitter plate 2 and thus extending inside and along the guidance of the plural grooves on the anode splitter plate 2 while avoiding the obstruction coming from a bottom supporter 72 and an external weight block 721 so as to piece out of a high-temperature furnace 6, and then to be collected and connected to an anode terminal 82; and similarly, there are a plurality of cathode voltage lines 51 and a plurality of cathode current lines 52 that are arranged passing through the cathode splitter plate 4 and thus extending inside and along the guidance of the plural grooves on the cathode splitter plate 4 while avoiding the obstruction coming from a top supporter 71 and an external weight block 711 so as to piece out of a high-temperature furnace 6, and then to be collected and connected to a cathode terminal 81. It is noted that for the plural anode current-collector units 3 and the plural cathode current-collector units 3, they are basically the same type of devices that are made of the same material and in the same size. Moreover, for the minimizing the resistance effect upon the current lines 52, 32, the plural current lines 52, 32 are conductive lines of the same wire diameter, the same length and also made of the same material.

Operationally, the SOFC 10 is sandwiched between the assembly of the cathode current-collector units 5 and the assembly of the anode current-collector units 3 in a manner that the anode of the SOFC 10 is connected to the anode current-collector units 3 on the anode splitter plate 2 and the cathode of the SOFC 10 is connected to the cathode current-collector units 5 on the cathode splitter plate 4. Thereby, substantially the integration of the SOFC 10, the anode current-collector units 3 and the cathode current-collector units 5 is sandwiched between the anode splitter plate 2 and the cathode splitter plate 4, while allowing the integration to be fixedly compressed and thus secured between the two plates 2, 4 by the use of the top supporter 71, the bottom supporter 72 and their corresponding two weight blocks 711, 721, and simultaneously enabling the cathode thermocouple 45 and the anode thermocouple 25 to connected to an external measurement apparatus while allowing a cathode gas and an anode gas to be guided therein.

After the SOFC 10 is subjected in an environment satisfying a specific environmental condition, the following tests can be performed:

(1) a lateral impedance measurement upon a contact layer of the SOFC, being performed respectively for the cathode and the anode of the SOFC, and for the cathode, the lateral impedance measurement is performed by first selecting any two cathode current-collector units from the plural cathode current-collector units, and then connecting the selected two cathode current-collector units to an impedance measuring unit using voltage lines and current lines to the corresponding voltage terminals and current terminals in a four-wire-type circuit manner so as to measure the lateral impedance; and for the anode the lateral impedance measurement is performed similar to the lateral impedance measurement for the cathode;

(2) a local characteristics measurement by the detection of open circuit voltage (OCV) variation, being performed by connecting each and every current-collector units respectively to a voltage measurement apparatus;

(3) a local performance measurement for the SOFC, being performed by first selecting any two cathode current-collector units and two corresponding anode current-collector units that are symmetrically arranged with respect to the selected cathode current-collector units, and then connecting an electronic load measuring unit to the terminals corresponding to the selected current-collector units;

(4) a local impedance measurement for the SOFC, being performed by first selecting any two cathode current-collector units and two corresponding anode current-collector units that are symmetrically arranged with respect to the selected cathode current-collector units, and then connecting an impedance measuring unit to the terminals corresponding to the selected current-collector units;

(5) a local voltage variation measurement under fixed current for the SOFC, being performed by first parallel connecting the terminals corresponding to the current lines of all anode and cathode current-collector units while enabling the parallelly connected terminals to be connected to an electronic load measuring unit, and then connecting a voltage measuring unit respectively to the terminals corresponding to the voltage lines of all anode and cathode current-collector units; and (6) an overall cell performance and impedance measurement for the SOFC, being performed by first parallel connecting the terminals corresponding to the current lines of all anode and cathode current-collector units and also parallel connecting the terminals corresponding to the voltage lines of all anode and cathode current-collector units, while enabling the parallelly connected terminals to be connected to an electronic load measuring unit.

Moreover, for minimizing the chance of the metal oxidation and thus causing any toxicity in the fuel cell, the cathode splitter plate and the anode splitter plate are mode of a ceramic material with good high temperature stability.

To sum up, by the use of the testing device of the present invention, a simple reliable test environment can be created for allowing a multifunctional measurement to be performed upon a SOFC rapidly and accurately.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A testing device for solid oxide fuel cell, comprising:
a cathode splitter plate;
an anode splitter plate, constructed the same as the cathode splitter plate and arranged at a position corresponding to the cathode splitter plate;
a plurality of cathode current-collector units, each being disposed near to the cathode splitter plate at a position between the cathode splitter plate and the anode splitter plate, and each being connected to a plurality of cathode current lines and a plurality of cathode voltage lines that are arranged threading through the cathode splitter plate in respective; and
a plurality of anode current-collector units, each being disposed near to the anode splitter plate at a position between the cathode splitter plate and the anode splitter plate, and each being connected to a plurality of anode current lines and a plurality of anode voltage lines that are arranged threading through the anode splitter plate in respective;

wherein, the assembly of the plural cathode current-collector units are spaced from the assembly of the plural anode current-collector units by a gap for allowing a solid oxide fuel cell (SOFC) to be disposed therebetween in a manner that the SOFC is connected to the assembly of the plural cathode current-collector units by a cathode electrode thereof and simultaneously connected to the assembly of the plural anode current-collector units by an anode electrode thereof; and wherein the plural cathode current lines and the plural cathode voltage lines are arranged to extend inside and along the guidance of a plural grooves after threading through and out of the cathode splitter plate independently and respectively so as to piece out of a high-temperature furnace, and then to be connected to cathode terminals; and the plural anode current lines and the plural anode voltage lines are arranged to extend inside and along the guidance of the plural grooves after threading through and out of the anode splitter plate so as to piece out of a high-temperature furnace independently and respectively, and then to be connected to anode terminals.

2. The testing device of claim 1, wherein one surface of the cathode splitter plate is formed with a plurality of flow channels while allowing another surface of the cathode splitter plate to be formed with the plurality of grooves; and one surface of the anode splitter plate is formed with a plurality of flow channels while allowing another surface of the anode splitter plate to be formed with a plurality of grooves.

3. The testing device of claim 1, wherein each of the cathode splitter plate and the anode splitter plate is made of a ceramic material with good high temperature stability.

4. The testing device of claim 1, wherein the cathode splitter plate is coupled to a top supporter at a side thereof that is away from the anode splitter plate, and the anode splitter plate is coupled to a bottom supporter at a side thereof that is away from the cathode splitter plate.

5. The testing device of claim 4, wherein each of the top supporter and the bottom supporter is configured with a weight block.

6. The testing device of claim 1, further comprising:
a gas transmission mechanism, being disposed on the surface of the cathode splitter plate where the grooves are formed.

7. The testing device of claim 6, wherein the gas transmission mechanism further comprises:
a cathode gas conduit, being arranged in communication with the cathode splitter plate by an end thereof;
a cathode three-way tube, being coupled to an end of the cathode gas conduit that is not coupled to the cathode splitter plate for allowing the same to be in communication with the cathode gas conduit; and
a cathode thermocouple, arranged extending through an end of the cathode three-way tube that is not coupled to the cathode gas conduit, and then reaching to a cathode side of the SOFC.

8. The testing device of claim 1, further comprising:
a fuel transmission mechanism, being disposed on the surface of the anode splitter plate where the grooves are formed.

9. The testing device of claim 8, wherein the fuel transmission mechanism further comprises:
an anode gas conduit, being arranged in communication with the anode splitter plate by an end thereof;
an anode three-way tube, being coupled to an end of the anode gas conduit that is not coupled to the anode splitter plate for allowing the same to be in communication with the anode gas conduit; and
an anode thermocouple, arranged extending through an end of the anode three-way tube that is not coupled to the anode gas conduit, and then reaching to an anode side of the SOFC.

* * * * *